United States Patent [19]
Robertson

[11] 4,003,596
[45] * Jan. 18, 1977

[54] CAMPER KIT

[75] Inventor: Robert H. Robertson, Dallas, Tex.

[73] Assignee: Ronbil Industries, Inc., Mesquite, Tex.

[ * ] Notice: The portion of the term of this patent subsequent to Aug. 7, 1990, has been disclaimed.

[22] Filed: Mar. 21, 1975

[21] Appl. No.: 560,327

Related U.S. Application Data

[63] Continuation of Ser. No. 377,316, July 9, 1973, abandoned, which is a continuation-in-part of Ser. No. 254,540, May 18, 1972, Pat. No. 3,751,103.

[52] U.S. Cl. .................................. 296/23 R; 5/357; 296/69
[51] Int. Cl.² ........................................... B60P 3/38
[58] Field of Search ............ 296/39 R, 37 R, 24 R, 296/69, 10, 1 F, 23 R; 5/5, 357; 297/DIG. 2

[56] References Cited
UNITED STATES PATENTS

| 3,669,817 | 6/1972 | McDevitt | 296/1 F |
| 3,751,103 | 8/1973 | Robertson | 296/23 R |
| 3,814,473 | 6/1974 | Lorenzen, Jr. | 296/39 R |

FOREIGN PATENTS OR APPLICATIONS

| 140,165 | 8/1934 | Austria | 5/12 R |
| 862,378 | 3/1961 | United Kingdom | 296/39 R |

*Primary Examiner*—Robert J. Spar
*Assistant Examiner*—Donald W. Underwood
*Attorney, Agent, or Firm*—Richards, Harris and Medlock

[57] ABSTRACT

The specification discloses interior assembly for installation in a pickup truck having a camper cover. A floor covering is shaped to fit the bottom of the pickup bed. The pair of elongated side panels are dimensioned to cover the interior sides of the pickup bed. The side panels include an integrally formed enclosure dimensioned to receive the wheel wells of the pickup bed. A plurality of cooperative rectangular cushions are dimensioned for selective arrangement within the pickup bed as a couch or as a bed. The various components and interior assembly may be conveniently packaged as a compact kit for shipment to and installation by the consumer.

3 Claims, 11 Drawing Figures

CAMPER KIT

CROSS REFERENCE TO RELATED APPLICATION

The present patent application is a continuation of application Ser. No. 377,316 filed July 9, 1973, now abandoned, which was a continuation-in-part of application Ser. No. 254,540 filed may 18, 1972 and entitled "Interior Assembly for a Pickup Camper," now U.S. Pat. No. 3,751,103.

FIELD OF THE INVENTION

This invention relates to interior assemblies, and more particularly, relates to interior assemblies for installation in pickup trucks having a camper cover.

THE PRIOR ART

A large number of camper covers, sometimes termed "pickup toppers," are currently installed over the beds of conventional pickup trucks. The camper covers provide an enclosure which may be used as sleeping quarters and the like for traveling during hunting and fishing trips. Generally, the interior of the enclosure is only partially furnished, and often includes only a mattress or bedroll disposed on the bare metal pickup bed. It has thus been proposed to utilize rugs to cover the pickup bed within such camper covers, but problems have arisen in affixing the rugs to the pickup bed.

Moreover, the existence of wheel well covers in conventional pickup trucks presents difficulties in covering the entire floor of the pickup camper. It has been heretofore proposed to utilize boxes which cover the pickup wheel well covers and which provide side seating. However, such boxes not only utilize a substantial amount of space within the pickup camper, but also detracts from the overall appearance of the interior of the camper. Moreover, the previously developed boxes have been difficult to install and have often not been adapted for convenient attachment within the pickup bed.

The above-referenced copending patent application discloses an assembly for installation in a pickup having a rug shaped to cover the bottom of the pickup bed and includes curved side portions which are contoured to cover the wheel well covers of the pickup bed. A pair of elongated side panels are dimensioned to cover the interior side of the pickup bed and include cut-out portions for receiving the wheel well covers of the pickup bed.

SUMMARY OF THE INVENTION

In accordance with the present invention, a relatively inexpensive interior assembly is provided which may be easily and conveniently installed within a pickup camper to provide an attractive and comfortable interior. The assembly includes a floor covering which may be securely maintained in place without the requirement of difficult installation procedures. Moreover, the assembly includes attractive opposite side wall panels which are provided with integral enclosures for covering the wheel well assemblies. The side panels are easily installed and do not occupy an unnecessary large space within the camper. The assembly also includes cushions which may be selectively arranged to form a comfortable couch or a large bed.

In accordance with the specific aspect of the invention, the assembly is provided for installation in a pickup having a camper cover. The assembly includes a floor covering shaped to cover the bottom of the pickup. A pair of elongated side panels are dimensioned to cover the interior side of the pickup bed and include enclosure portions for receiving the wheel wells of the pickup bed. Fasteners are provided to attach side panels to the interior sides of the pickup bed so that the bottom edges of the side panels exert sufficient downward force on the edges of the floor covering to hold the covering in place. A plurality of the cushions are dimensioned to be selectively arranged as a couch or bed.

The assembly may also include a front panel dimensioned for covering the bulkhead of the pickup bed interfitting between the ends of the side panels. The side panels and front panel are each preferably integrally moulded or formed from a suitable material such as fiber glass or light gauge metal. The floor covering may be in the form of a carpet over an underlayment of plywood sheeting or may be in the form of a floor covering such as a vinyl sheet.

DESCRIPTION OF THE DRAWINGS

For a more complete understanding of the present invention, for further objects and advantages thereof, reference is now made to the following description taken in conjunction with the accompanying drawings, in which.

DESCRIPTION OF THE PREFERRED EMBODIMENT

Figure 1:
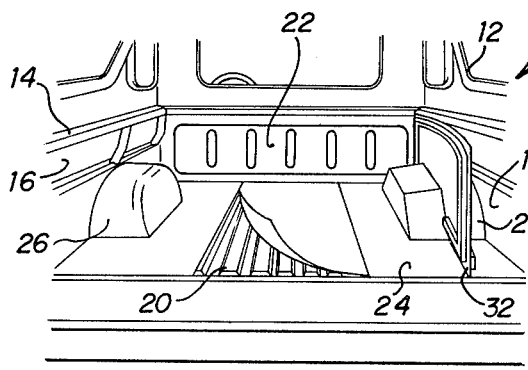
FIG. 1 is a perspective view of the rear of a pickup having a camper cover, illustrating the initial installation of the present interior assembly.

FIG. 1 illustrates the rear of a conventional pickup designated generally by the numeral 10 and having a camper cover 12 mounted thereon. Pickup 10 may comprise any one of a number of conventional current pickup models and includes a pickup bed 14 defined by opposite side walls 16 and 18 and front bulkhead 22 located at the rear of the pickup cab. Corrugated bed or bottom 20 extends between side walls 16 and 18. Wheel wells 26 and 28 extend into the pickup bed area.

The camper cover or topper 12 may comprise any one of a number of commercially available units. For example, the camper cover termed the Lincoln Topper, manufactured and sold by Lincoln Industries, Inc. of Stroud, Oklahoma, works well with the present invention. However, the present invention is adaptable to use with a wide variety of different makes of pickups and different types of camper covers. Also, it should be noted that although the present invention is described as being particularly applicable to use with a pickup, the present invention has broad use. The present assembly can be used with a van, trailer or other type vehicle.

As may be seen in FIG. 1, the interior of a conventional unadorned pickup camper cover is relatively barren and unattractive. Not only are the metal bottom and side walls of a pickup unattractive and uncomfortable, the rigidity of the walls presents a safety hazard for travel within the camper.

Figure 2:
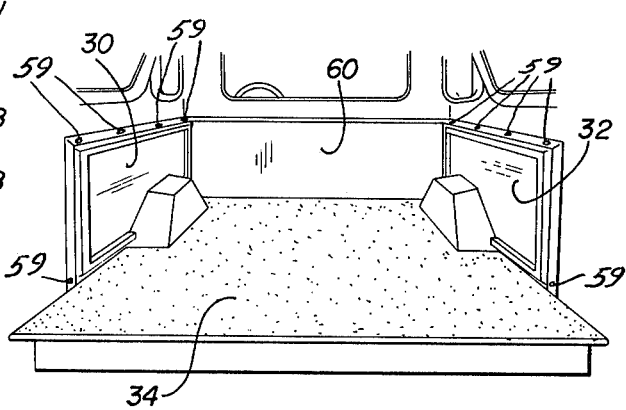
FIG. 2 is a perspective view of the pickup shown in FIG. 1 after installation of the present interior assembly.

As shown in FIGS. 1 and 2, the installation of the present assembly converts the interior of a conventional pickup camper into an attractive and comfortable space which enables one or more passengers to ride and sleep in safety and comfort during travel. The present interior kit includes opposite side panels 30 and 32 which extend along the interior sides 16 and 18 of the pickup bed. One or more rigid panels 24 are placed over the corrugated bottom or floor 20 of the pickup beds. Panels 24 may be plywood or may be of other suitable material. For example, floor panel 24 may be of vinyl sheeting material or may be plywood covered with a plush shag carpet or rug 34 if desired. The floor panels and any floor covering are dimensioned and configured to fit within the interior of the truck bed and accommodate the opposite wheel well covers 26 and 28.

Figure 3:
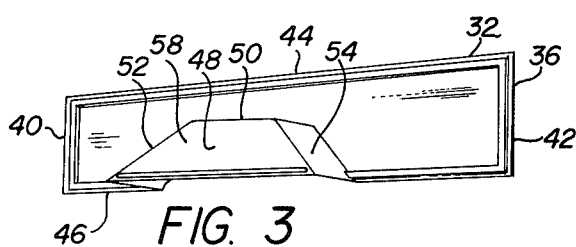
FIG. 3 is a perspective view of the front of one of the side panels of the present assembly.

Referring particularly to FIG. 3 which illustrates the right side panel 32 as being typical, it will be seen that the side panels have a generally rectangular elongated panel body 36 having opposite vertical front and rear edges 40 and 42 and top and bottom sides 44 and 46, respectively. Panel body 36 conforms to the interior dimension of the pickup side walls. A cut-out 38 is provided in the lower side 46 of the panel to accommodate the cross-section of the respective wheel wells over which it is to be mounted. The integral enclosure 48 is provided as an attachment to body member 36. The enclosure 48 has a generally flat upper surface 50, angular front and rear sides 52 and 54 and interior vertical side 58. The flat upper surface 50 conveniently can be used as a storage shelf or as an auxiliary seat. Enclosure 48 is dimensioned to completely house or cover the particular wheel well. The lower edge 56 of the panel applies a downward force on the floor covering 34 and assists in holding the floor covering securely in place against the floor panels 24 of the pickup.

The side panels 30 and 32 may be fabricated from any convenient material. For example, these panels may be comprised of high grade plywood, or preferably, may be stamped from a light gauge metal such as aluminum or molded or vacuum formed from a suitable plastic material such as ABS. Due to the lightness of the panels, they may be easily shipped and installed.

Thus, with the opposite side panels 30 and 32 and the floor covering 34 in place, a simple and attractive interior is provided for a pickup camper. However it may be desirable to provide additional interior treatment for the interior of the pickup camper. Accordingly, a front panel 60 may be provided extending between the side panels 30 and 32 covering the exposed bulkhead 22 and the front of the pickup bed 14. Panel 60 is generally rectangular and is similar in appearance and construction to side panels 32 and is adapted to interfit between them. Alternatively, panel 60 may be constructed as a fabric covered foam cushion.

The camper cover of the present invention is easily installed into the bed of a pickup truck. Floor panels 24 are placed on the floor 20 of the pickup. Any floor covering 34 such as carpeting, if desired, is merely dropped into place over the underlying floor panels. No adhesive or fastening device is required to mount carpet 34 in place. The downward force upon the edges of the floor coverings acts as a knife edge for clamping the covering in place. This enables the assembly to be easily installed and removed in case it is desired to haul industrial or farm loads within the pickup. In the installation of the side panesl 30 and 32, the front ends of the panels are positioned against the bulkhead of the pickup. The rear ends of panels are then pulled securely into place against the side walls of the bed. Once the side panels 30 and 32 are properly positioned, conventional fasteners, such as sheet metal screws, 59 (FIG. 2) are used to firmly secure the panels to the interior sides of the pickup bed. To the particular construction of the assembly, a minimum of fasteners are required. Thus, the panels 30 and 32 may be quickly and easily installed and removed. It will be known that the upper edges 44 of panels 30 and 32 generally correspond to the bottom of the camper top to provide a pleasing appearance.

The front panel 60 may then be secured in the forward end of the pickup bed. As described above, front panel 60 is dimensioned to correspond to the front bulkhead of the pickup bed for an interfitting fit between the end of said panels 30 and 32. Front panel 60 is not necessary but adds a completed or finished look to the interior of the pickup. Front panel 60, being tightly fitted, can simply be forced into place between the side panels. If necessary, fasteners can be placed through the panel and secured in the bulkhead. Also adhesives such as epoxy glue or the like can be used to secure the side front panels to the pickup walls if a more permanent installation is desired. As previously noted, panel 60 may be rigid or may comprise a fabric covered foam cushion.

Figure 5:
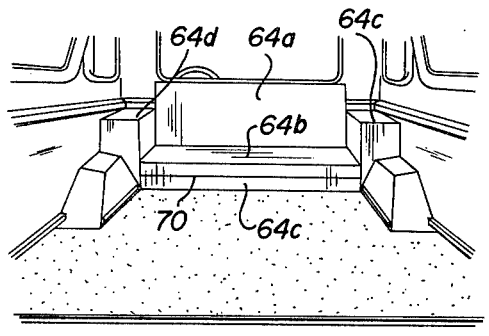
FIG. 5 is a perspective view of a pickup shown in FIG. 1 after installation of the present interior assembly and including a plurality of cushions of the assembly arranged in a couch configuration.
Figure 4:
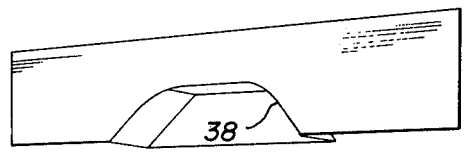
FIG. 4 is a perspective view of the rear of one of the side panels of the present assembly.
Figure 6:
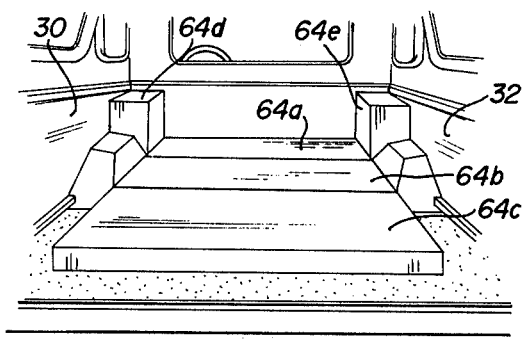
FIG.6 is a perspective view similar to that of FIG. 5 but with the cushions arranged as a bed.
Figure 7:
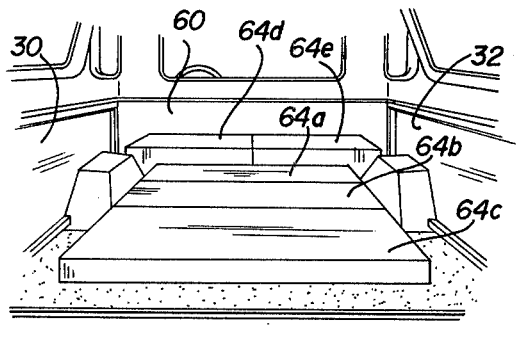
FIG. 7 is a perspective view similar to that of FIG. 6 but with the cushions arranged in another bed configuration.

Another important aspect of the present interior assembly is the provision of five cushions 64a – e which may be selectively arranged either as a couch as shown in FIG. 5 or as a bed as shown in FIGS. 6 and 7. When cushions 64a – e are arranged as a couch, cushion 64a forms a couch back while similarly shaped cushions 64b and 64c are stacked upon one another to form the couch seat. Cushions 64d and 64e are dimensioned to fit between the wheel well covers 26 and 28 and the front bulkhead of the pickup in order to serve as couch arm rests or ends. The cushion 64a in FIG. 5 rests against the front panel 60 or the bulkhead of the pickup in a manner to provide the back cushion of the couch.

FIG. 6 shows arrangements of the cushions 64a – e as a bed. Cushions 64d – e remain in an upright position between the wheel wells and the front bulkhead of the pickup. Cushions 64a – 64c are placed in a side-by-side arrangement on the floor covering to form a generally horizontal bed surface. Alternately, as seen in FIG. 7, the cushions 64d and 64e may be positioned to form a headboard being placed on their side in an end-to-end relation against the bulkhead or front panel 60 of the pickup truck. Preferably, cushions 64b and 64c are hinged along a common edge 70 by a piece of fabric so that the cushions 64b and 64c may be vertically stacked and not shift relative to one another during movement of the pickup. Cushion 64a is not hinged to cushion 64b and 64c so that the couch may be arranged without a void in the lower back portion.

Figure 8:
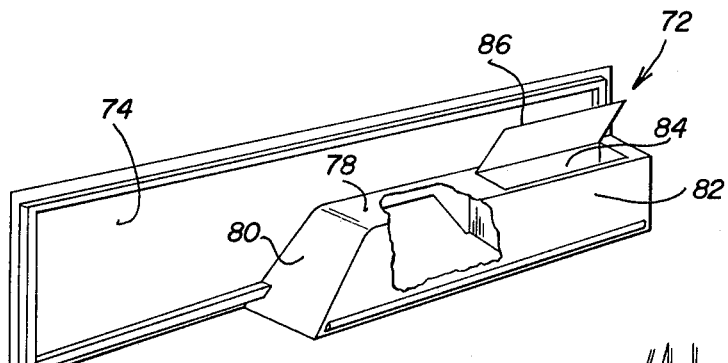
FIG. 8 is a perspective view of another form of the side panel of the present assembly.
Figure 9:
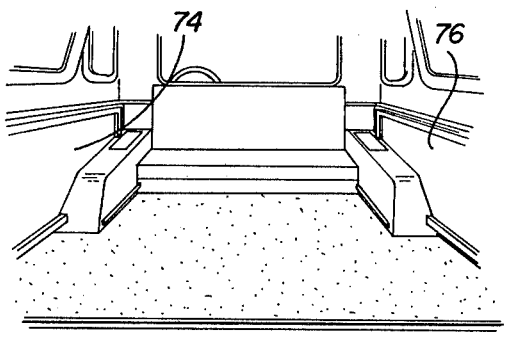
FIG. 9 is a perspective view of the rear of a pickup camper illustrating the installation of side panels as shown in FIG. 8.

FIGS. 8 and 9 show another embodiment of the present invention generally designated by the numeral 72. In this embodiment, side panels 74 and 76 are designed to fit against the opposite sides of the camper. As seen in FIG. 8, panel 74 is generally rectangular and corresponds in size to the interior of the camper side wall. A housing 78 is integrally formed with the panel and has a forward enclosure 80 adapted to receive the wheel well. A compartment portion 82 projects to the front edge of panel 74 and is provided with a receptacle 84 having a cover 86. Compartment 82 may be used for storage or articles or may be suitably insulated to serve as an ice chest for maintaining food and beverages in a chilled condition. Opposite panel 76 is similar to panel 74.

Figure 10:
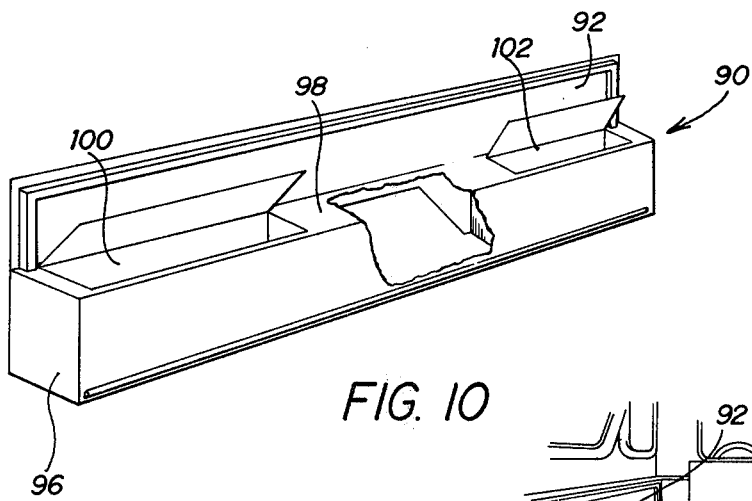
FIG. 10 is a perspective view illustrating another embodiment of the side panels of the present assembly.
Figure 11:
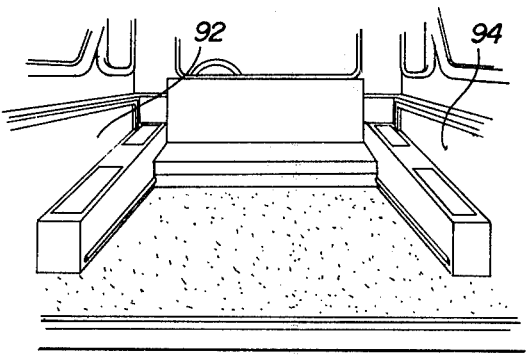
FIG. 11 is a perspective view of the rear of a pickup camper illustrating the installation of side panels shown in FIG. 10.

FIGS. 10 and 11 show another embodiment of the present invention generally designated by the numeral 90. In this embodiment panels 92 and 94 again are secured against the opposite interior sides of the pickup bed. Panel 92 is illustrated in FIG. 10 and is representative of both side panels. Panel 92 is generally rectangular and elongate and dimensioned to correspond to the interior of the pickup side wall. A housing 96, which is generally rectangular, extends along the full length of panel 92. The intermediate portion of the panels form an enclosure 98 to receive the wheel well of the pickup. The end of the housing 96 defines a compartment 100 for storage of articles. The front end of the panel is provided with a second compartment 102. Again, either one or both of the compartments 100 and 102 may be suitably insulated with a material to serve as an ice chest for maintaining food and beverages in a chilled condition. Alternately, either one of these compartments may simply serve as a receptacle for storage of articles.

The present assembly can be stored or shipped in a relatively compact package and may be quickly and easily installed in any conventional pickup camper. The assembly provides an attractive and comfortable interior for a number of passengers and includes cushions which may be used as a couch or a bed. The installed assembly provides a soft resilient interior where the passengers can ride or sleep in quiet safety. The assembly may be easily removed when it is desired to haul loads in the pickup camper. With the side panels of the present invention, the wheel wells are obscured from view and completely enclosed without the necessity of providing special carpeting configurations over the wheel wells. Whereas the present invention has been described with respect to several specific embodiments thereof, it will be understood that various changes and modifications will be suggested to one skilled in the art and it is intended to emcompass such changes and modifications that fall within the scope of the appended claims.

What is claimed is:
1. An assembly for installation in a pickup having a camper cover comprising:
   a floor covering dimensioned to fit the bottom of a pickup bed;
   first and second elongated rigid side panels dimensioned to cover the interior sides of the pickup bed wherein each of said panels include an integral enclosure for receiving and covering the wheel well covers of the pickup bed, such that said side panels are independent relative to said floor covering;
   means for attaching said side panels to the interior sides of the pickup bed adjacent the edges of said floor covering on the bottom of the pickup bed, such that the bottom edges of said panels exert a sufficient force on the marginal edges of said floor covering to hold said floor covering in place;
   a plurality of cushions dimensioned for being selectively arranged on said floor covering as a couch and as a bed, said cushions including first and second generally rectangular cushions having lengths generally equal to the distance between said side panels for being disposed between said side panels and stacked one upon the other for use as a couch seat;
   a third generally rectangular cushion having a length generally equal to the distance between said side panels for being vertically positioned against the bulkhead of the pickup to serve as a couch back in conjunction with said first and second cushions; and
   said cushions having widths dimensioned to be disposed on said floor covering between said side panels in a side by side relationship to form a bed.
2. The assembly of claim 1 wherein said floor covering comprises a rug shaped to fit the bottom of the pickup bed and further including a rigid floor member for being disposed between said rug and the bottom of the pickup bed.
3. The assembly of claim 1 further including a front panel dimensioned for covering the bulkhead of the pickup bed and for interfitting between the front ends of said side panels.

* * * * *